US012711899B2

(12) United States Patent
Lee

(10) Patent No.: US 12,711,899 B2
(45) Date of Patent: Aug. 18, 2026

(54) PIXEL AND DISPLAY APPARATUS HAVING THE SAME

(71) Applicant: Samsung Display Co., LTD., Yongin-si (KR)

(72) Inventor: Heechul Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 23 days.

(21) Appl. No.: 18/738,343

(22) Filed: Jun. 10, 2024

(65) Prior Publication Data

US 2025/0046234 A1 Feb. 6, 2025

(30) Foreign Application Priority Data

Aug. 2, 2023 (KR) ........................ 10-2023-0101306

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/045* (2013.01)

(58) Field of Classification Search
CPC combination set(s) only.
See application file for complete search history.

(56) References Cited

U.S. PATENT DOCUMENTS

2024/0185782 A1* 6/2024 Sakai .................. G09G 3/3233
2024/0412691 A1* 12/2024 Yuan .................... G09G 3/3233

* cited by examiner

*Primary Examiner* — William Boddie
*Assistant Examiner* — Alecia D English
(74) *Attorney, Agent, or Firm* — CANTOR COLBURN LLP

(57) ABSTRACT

A pixel includes a light emitting element, a driving transistor, a data writing transistor and a leakage current compensator. The driving transistor applies a driving current to the light emitting element. The data writing transistor applies a data voltage to the driving transistor in response to a first writing signal and connected to a first electrode of the driving transistor. The leakage current compensator is connected to a second electrode of the driving transistor and operates in a way such that a turned-off state of the driving transistor is maintained in an emission waiting period in response to a second writing signal different from the first writing signal. The leakage current compensator includes an eighth transistor and the turned off state of the driving transistor is maintained in the emission waiting period by the eighth transistor connected to the second electrode of the driving transistor.

17 Claims, 11 Drawing Sheets

PIXEL AND DISPLAY APPARATUS HAVING THE SAME

This application claims priority to Korean Patent Application No. 10-2023-0101306, filed on Aug. 2, 2023, and all the benefits accruing therefrom under 35 U.S.C. § 119, the content of which in its entirety is herein incorporated by reference.

BACKGROUND

1. Field

Embodiments of the invention relate to a pixel and a display apparatus including the pixel. More particularly, embodiments of the invention relate to a pixel for compensating a leakage current to enhance a display quality and a display apparatus including the pixel.

2. Description of the Related Art

Generally, a display apparatus includes a display panel and a display panel driver. The display panel typically includes a plurality of gate lines, a plurality of data lines, a plurality of emission lines and a plurality of pixels. The display panel driver may include a gate driver for providing gate signals to the gate lines, a data driver for providing data voltages to the data lines, an emission driver for providing emission signals to the emission lines and a driving controller for controlling the gate driver, the data driver and the emission driver.

SUMMARY

In a display device, threshold voltages of transistors of pixels may be changed by a frictional electricity or changed in a high temperature condition. When the threshold voltages of the transistors of the pixels are changed, current may leak at the transistors.

Embodiments of the invention provide a pixel for enhancing a display quality.

Embodiments of the invention also provide a display apparatus including the pixel.

In an embodiment of a pixel according to the invention, the pixel includes a light emitting element, a driving transistor, a data writing transistor and a leakage current compensator. In such an embodiment, the driving transistor applies a driving current to the light emitting element. In such an embodiment, the data writing transistor applies a data voltage to the driving transistor in response to a first writing signal and connected to a first electrode of the driving transistor. In such an embodiment, the leakage current compensator is connected to a second electrode of the driving transistor and operates in a way such that a turned-off state of the driving transistor is maintained in an emission waiting period in response to a second writing signal different from the first writing signal.

In an embodiment, the leakage current compensator may include an eighth transistor including a control electrode which receive the second writing signal, a first electrode which receive the data voltage and a second electrode connected to the second electrode of the driving transistor.

In an embodiment, an activation level of the second writing signal may be maintained.

In an embodiment, the pixel may further include a storage capacitor. In such an embodiment, the storage capacitor may include a first electrode which receive a first power voltage and a second electrode connected to the control electrode of the driving transistor. In such an embodiment, the second writing signal is the first power voltage.

In an embodiment, the leakage current compensator may include an eighth transistor and a first capacitor. In such an embodiment, the eighth transistor may include a control electrode which receive the second writing signal, a first electrode which receive the data voltage and second electrode connected to a fifth node. In such an embodiment, the first capacitor may include a first electrode connected to the fifth node and a second electrode connected to the second electrode of the driving transistor.

In an embodiment, a voltage level of the second writing signal may be maintained at an inactivation level during a frame period.

In an embodiment, the emission waiting period may be subsequent to a writing period in which the first writing signal may have an activation level. In such an embodiment, the first writing signal and the second writing signal may have an inactivation level in the emission waiting period.

In an embodiment, the pixel may include a first transistor including a control electrode connected to a first node, a first electrode connected to a second node and a second electrode connected to a third node, a second transistor including a control electrode which receive the first writing signal, a first electrode which receive the data voltage and a second electrode connected to the second node, a third transistor including a control electrode which receive the first writing signal, a first electrode connected to the third node and a second electrode connected to the first node, a fourth transistor including a control electrode which receive an initialization signal, a first electrode which receive an initialization voltage and a second electrode connected to the first node, a fifth transistor including a control electrode which receive an emission signal, a first electrode which receive a first power voltage and a second electrode connected to the second node, a sixth transistor including a control electrode which receive the emission signal, a first electrode connected to the third node and a second electrode connected to a fourth node, a seventh transistor including a control electrode which receive the first writing signal, a first electrode which receive the initialization voltage and a second electrode connected to the fourth node, an eighth transistor including a control electrode which receive the second writing signal, a first electrode which receive the data voltage and a second electrode connected to the third node, a second capacitor including a first electrode which receive the first power voltage and a second electrode connected to the first node and the light emitting element including a first electrode connected to the fourth node and a second electrode which receive a second power voltage. In such an embodiment, the driving transistor may be the first transistor. In such an embodiment, the data writing transistor may be the second transistor. In such an embodiment, the leakage current compensator may include the eighth transistor. In such an embodiment, a voltage level of the second writing signal may be maintained at an inactivation level during a frame period.

In an embodiment, a frame period of the pixel may include an initialization period in which the emission signal may have an inactivation level, the initialization signal may have an activation level, the first writing signal may have an inactivation level and the second writing signal may have an inactivation level, a writing period in which the emission signal may have an inactivation level, the initialization signal may have an inactivation level, the first writing signal may have an activation level and the second writing signal may have an inactivation level, the emission waiting period in which the emission signal may have an inactivation level, the initialization signal may have an inactivation level, the first writing signal may have an inactivation level and the second writing signal may have an inactivation level and an emission period in which the emission signal may have an activation level, the initialization signal may have an inactivation level, the first writing signal may have an inactivation level and the second writing signal may have an inactivation level.

In an embodiment, the pixel may include a first transistor including a control electrode connected to a first node, a first electrode connected to a second node and a second electrode connected to a third node, a second transistor including a control electrode which receive the first writing signal, a first electrode which receive the data voltage and a second electrode connected to the second node, a third transistor including a control electrode which receive the first writing signal, a first electrode connected to the third node and a second electrode connected to the first node, a fourth transistor including a control electrode which receive an initialization signal, a first electrode which receive an initialization voltage and a second electrode connected to the first node, a fifth transistor including a control electrode which receive an emission signal, a first electrode which receive a first power voltage and a second electrode connected to the second node, a sixth transistor including a control electrode which receive the emission signal, a first electrode connected to the third node and a second electrode connected to a fourth node, a seventh transistor including a control electrode which receive the first writing signal, a first electrode which receive the initialization voltage and a second electrode connected to the fourth node, an eighth transistor including a control electrode which receive the second writing signal, a first electrode which receive the data voltage and a second electrode connected to a fifth node, a first capacitor including a first electrode connected to the fifth node and a second electrode connected to the third node, a second capacitor including a first electrode which receive the first power voltage and a second electrode connected to the first node and the light emitting element including a first electrode connected to the fourth node and a second electrode which receive a second power voltage. In such an embodiment, the driving transistor may be the first transistor. In such an embodiment, the data writing transistor may be the second transistor. In such an embodiment, the leakage current compensator may include the eighth transistor and the first capacitor. In such an embodiment, a voltage level of the second writing signal may be maintained at an inactivation level during a frame period.

In an embodiment, the pixel may include a first transistor including a control electrode connected to a first node, a first electrode connected to a second node and a second electrode connected to a third node, a second transistor including a control electrode which receive the first writing signal, a first electrode which receive the data voltage and a second electrode connected to the second node, a third transistor including a control electrode which receive the first writing signal, a first electrode connected to the third node and a second electrode connected to the first node, a fourth transistor including a control electrode which receive an initialization signal, a first electrode which receive a first initialization voltage and a second electrode connected to the first node, a fifth transistor including a control electrode which receive an emission signal, a first electrode which receive a first power voltage and a second electrode connected to the second node, a sixth transistor including a control electrode which receive the emission signal, a first electrode connected to the third node and a second electrode connected to a fourth node, a seventh transistor including a control electrode which receive the first writing signal, a first electrode which receive a second initialization voltage and a second electrode connected to the fourth node, an eighth transistor including a control electrode which receive the second writing signal, a first electrode which receive the data voltage and a second electrode connected to the third node, a second capacitor including a first electrode which receive the first power voltage and a second electrode connected to the first node and the light emitting element including a first electrode connected to the fourth node and a second electrode which receive a second power voltage. In such an embodiment, the driving transistor may be the first transistor. In such an embodiment, the data writing transistor may be the second transistor. In such an embodiment, the leakage current compensator may include the eighth transistor. In such an embodiment, a voltage level of the second writing signal may be maintained at an inactivation level during a frame period.

In an embodiment, the pixel may include a first transistor including a control electrode connected to a first node, a first electrode connected to a second node and a second electrode connected to a third node, a second transistor including a control electrode which receive the first writing signal, a first electrode which receive the data voltage and a second electrode connected to the second node, a third transistor including a control electrode which receive a compensation signal, a first electrode connected to the third node and a second electrode connected to the first node, a fourth transistor including a control electrode which receive an initialization signal, a first electrode which receive an initialization voltage and a second electrode connected to the first node, a fifth transistor including a control electrode which receive an emission signal, a first electrode which receive a first power voltage and a second electrode connected to the second node, a sixth transistor including a control electrode which receive the emission signal, a first electrode connected to the third node and a second electrode connected to a fourth node, a seventh transistor including a control electrode which receive the first writing signal, a first electrode which receive the initialization voltage and a second electrode connected to the fourth node, an eighth transistor including a control electrode which receive the second writing signal, a first electrode which receive the data voltage and a second electrode connected to the third node, a second capacitor including a first electrode which receive the first power voltage and a second electrode connected to the first node and the light emitting element including a first electrode connected to the fourth node and a second electrode which receive a second power voltage. In such an embodiment, the driving transistor may be the first transistor. In such an embodiment, the data writing transistor may be the second transistor. In such an embodiment, the leakage current compensator may include the eighth transistor. In such an embodiment, a voltage level of the second writing signal may be maintained at an inactivation level during a frame period.

In an embodiment of a display apparatus according to the invention, the display apparatus includes a display panel, a gate driver, a data driver and an emission driver. In such an embodiment, the display panel includes a pixel. In such an embodiment, the gate driver applies a gate signal to the pixel. In such an embodiment, the data driver applies a data voltage to the pixel. In such an embodiment, the emission driver applies an emission signal to the pixel. In such an embodiment, the pixel include a light emitting element, a driving transistor which applies a driving current to the light emitting element, a data writing transistor which applies the data voltage in response to a first writing signal and connected to a first electrode of the driving transistor, and a leakage current compensator connected to a second electrode of the driving transistor, where the leakage current compensator operates in a way such that a turned-off state of the driving transistor is maintained in an emission waiting period in response to a second writing signal different from the first writing signal.

In an embodiment, the leakage current compensator may include an eighth transistor including a control electrode which receive the second writing signal, a first electrode which receive the data voltage and a second electrode connected to the second electrode of the driving transistor.

In an embodiment, a voltage level of the second writing signal may be maintained at an inactivation level during a frame period.

In an embodiment, the pixel may further include a storage capacitor. In such an embodiment, the storage capacitor may include a first electrode which receive a first power voltage and a second electrode connected to a control electrode of the driving transistor. In such an embodiment, the second writing signal is the first power voltage.

In an embodiment, the leakage current compensator may include an eighth transistor and a first capacitor. In such an embodiment, the eighth transistor may include a control electrode which receive the second writing signal, a first electrode which receive the data voltage and second electrode connected to a fifth node. In such an embodiment, the first capacitor may include a first electrode connected to the fifth node and a second electrode connected to the second electrode of the driving transistor.

In an embodiment, a voltage level of the second writing signal may be maintained at an inactivation level during a frame period.

In an embodiment, the emission waiting period may be subsequent to a writing period in which the first writing signal may have an activation level. In such an embodiment, the first writing signal and the second writing signal may have an inactivation level in the emission waiting period.

In an embodiment, the pixel may include a first transistor including a control electrode connected to a first node, a first electrode connected to a second node and a second electrode connected to a third node, a second transistor including a control electrode which receive the first writing signal, a first electrode which receive the data voltage and a second electrode connected to the second node, a third transistor including a control electrode which receive the first writing signal, a first electrode connected to the third node and a second electrode connected to the first node, a fourth transistor including a control electrode which receive an initialization signal, a first electrode which receive an initialization voltage and a second electrode connected to the first node, a fifth transistor including a control electrode which receive the emission signal, a first electrode which receive a first power voltage and a second electrode connected to the second node, a sixth transistor including a control electrode which receive the emission signal, a first electrode connected to the third node and a second electrode connected to a fourth node, a seventh transistor including a control electrode which receive the first writing signal, a first electrode which receive the initialization voltage and a second electrode connected to the fourth node, an eighth transistor including a control electrode which receive the second writing signal, a first electrode which receive the data voltage and a second electrode connected to the third node, a second capacitor including a first electrode which receive the first power voltage and a second electrode connected to the first node and the light emitting element including a first electrode connected to the fourth node and a second electrode which receive a second power voltage. In such an embodiment, the driving transistor may be the first transistor. In such an embodiment, the data writing transistor may be the second transistor. In such an embodiment, the leakage current compensator may include the eighth transistor. In such an embodiment, a voltage level of the second writing signal may be maintained at an inactivation level during a frame period.

According to embodiments of the pixel and the display apparatus described herein, when leakage current flows through the data writing transistor, a turned-off state of the driving transistor may be maintained by equalizing the voltage of the first electrode of the driving transistor and the second electrode of the driving transistor through the leakage current compensator. Accordingly, a voltage of a control electrode of the driving transistor may be maintained.

In such embodiments, since the voltage of the control electrode of the driving transistor may be maintained, a luminance control of the pixel may be enhanced. Accordingly, a display quality of the display panel may be enhanced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
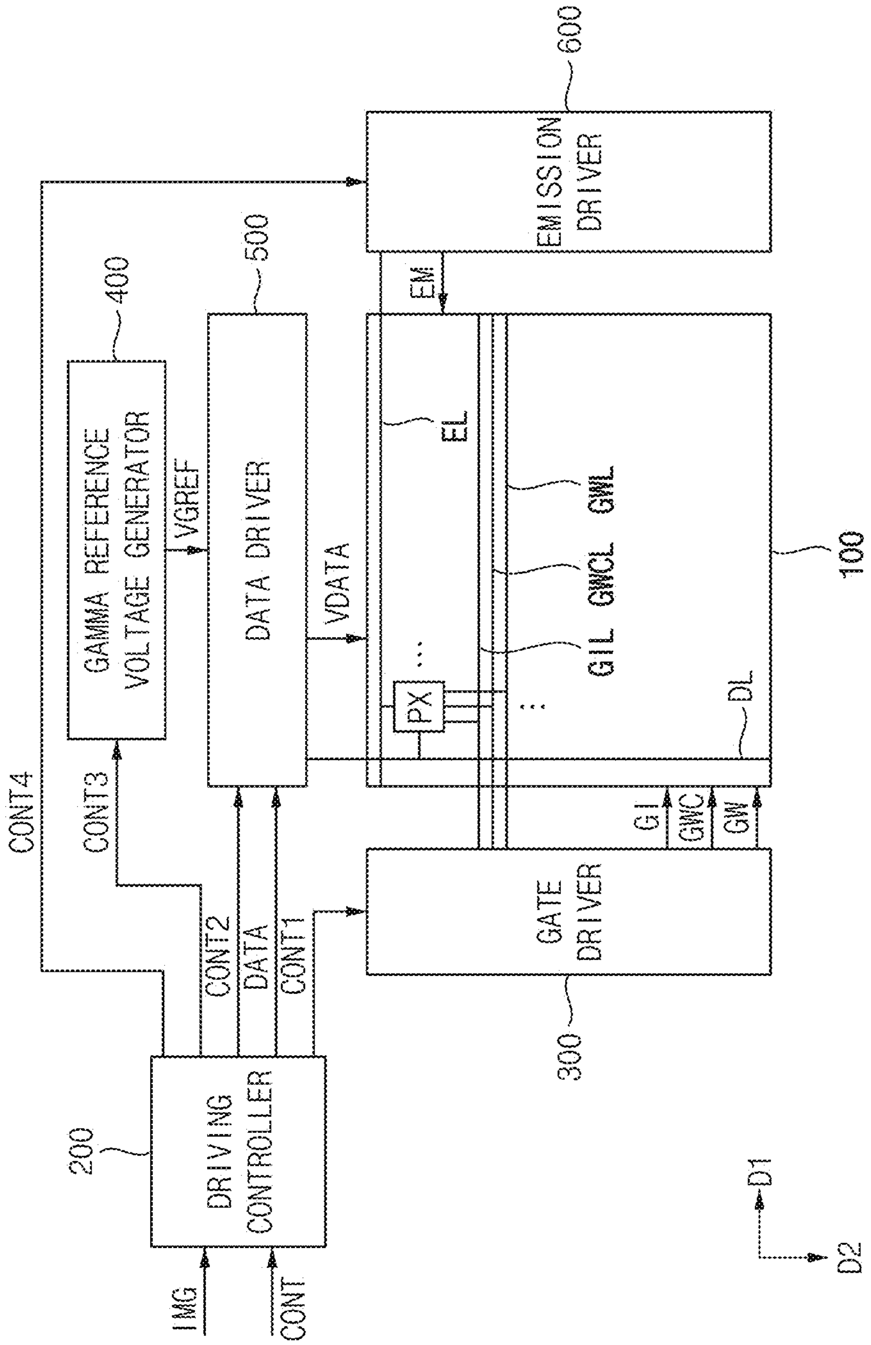
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in more detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate driver 300, a gamma reference voltage generator 400, a data driver 500 and an emission driver 600.

The display panel 100 includes a display region configured to display an image and a peripheral region adjacent to the display region.

The display panel 100 includes a gate line GL, a data line DL, an emission line EL and a pixel circuit PX electrically connected to the gate line GL, the data line DL and the emission line EL respectively. The gate line GL may extend in a first direction D1, the data line DL may extend in a second direction D2 crossing the first direction D1 and the emission line EL may extend in the first direction D1.

The driving controller 200 receives an input image data IMG and an input control signal CONT from an external device. In an embodiment, for example, the input image data IMG may include red image data, green image data and blue image data. The input image data IMG may further include white image data. In an embodiment, for example, the input image data IMG may include magenta image data, yellow image data and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT and outputs the generated first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT and outputs the generated second control signal CONT2 to the data driver 500. The second control signal CONT2 may include a horizontal start signal and a load signal.

The driving controller 200 generates the data signal DATA based on the input image data IMG and outputs the data signal DATA to the data driver 500.

The driving controller 200 generates the third control signal CONT3 for controlling an operation of the gamma reference voltage generator 400 based on the input control signal CONT and outputs the generated third control signal CONT3 to the gamma reference voltage generator 400.

The driving controller 200 generates the fourth control signal CONT4 for controlling an operation of the emission driver 600 based on the input control signal CONT and outputs the generated fourth control signal CONT4 to the emission driver 600.

The gate driver 300 generates a gate signal for driving the gate line GL in response to the first control signal CONT1 received from the driving controller 200. The gate driver 300 may output the gate signal to the gate line GL In an embodiment according to the invention, the gate driver 300 may be mounted on the peripheral region of the display panel 100. In an embodiment, for example, the gate driver 300 may be integrated (or integrally formed) on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to each of the data signal DATA.

In an embodiment, for example, the gamma reference voltage generator 400 may be disposed in the driving controller 200, or in the data driver 500.

The data driver 500 receives the second control signal CONT2 and the data signal DATA from the driving controller 200 and receive the gamma reference voltage VGREF from the gamma reference voltage generator 400. The data driver 500 may convert the data signal DATA into an analog form of a data voltage VDATA by using the gamma reference voltage VGREF. The data driver 500 may output the data voltage VDATA to the data line DL.

In an embodiment according to the invention, the data driver 500 may be mounted on the peripheral region of the display panel 100. In an embodiment, for example, the data driver 500 may be integrated (or integrally formed) on the peripheral region of the display panel 100.

The emission driver 600 generates emission signal EM for driving the emission line EL in response to the fourth control signal CONT4 received from the driving controller 200. The emission driver 600 may output the emission signal EM to the emission line EL.

In an embodiment, for example, the emission driver 600 may be integrated (or integrally formed) on the peripheral region of the display panel 100. In an embodiment, for example, the emission driver 600 may be mounted on the peripheral region of the display panel 100.

Although an embodiment where the gate driver 300 is disposed on a first side of the display panel 100 and the emission driver 600 is disposed on a second side of the display panel 100, which is opposite to the first side, is shown in FIG. 1 for convenience of illustration and description, the invention is not limited thereto. In an embodiment, for example, the gate driver 300 and the emission driver 600 may be disposed on a same side of the display panel 100. In an embodiment, for example, the gate driver 300 and the emission driver 600 may be disposed on both sides of the display panel 100. In an embodiment, for example, the gate driver 300 and the emission driver 600 may be formed integrally with each other, e.g., as a same integrated circuit chip.

Figure 2:
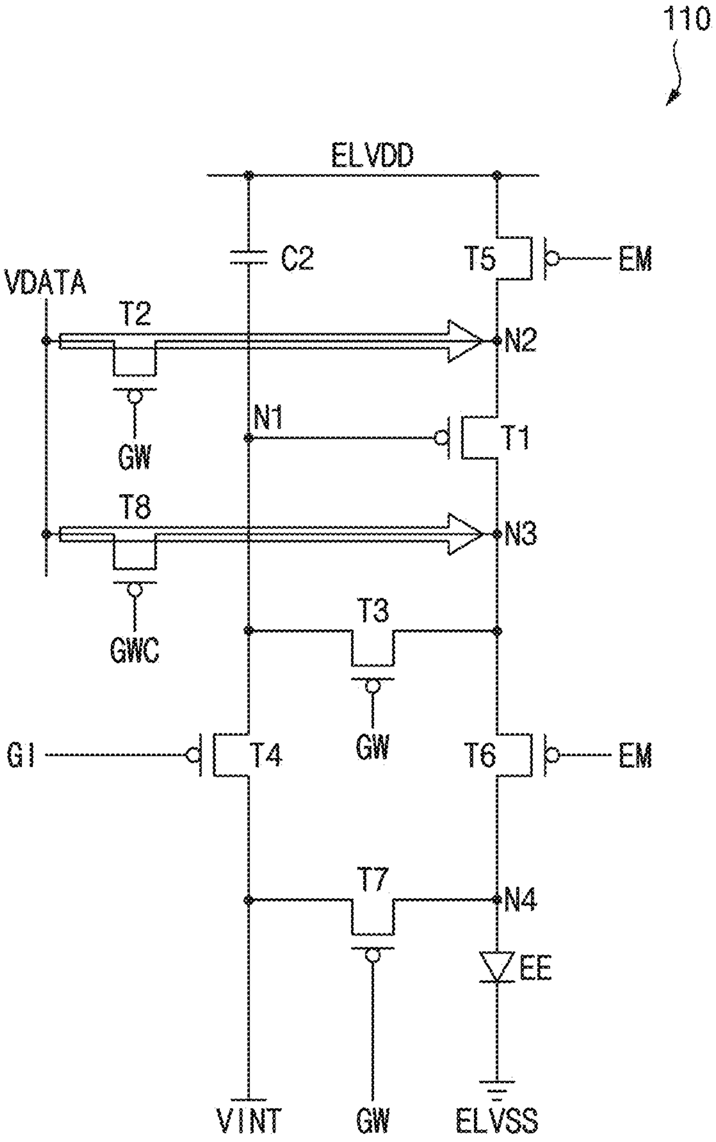
FIG. 2 is a circuit diagram illustrating a pixel of FIG. 1.
Figure 3:
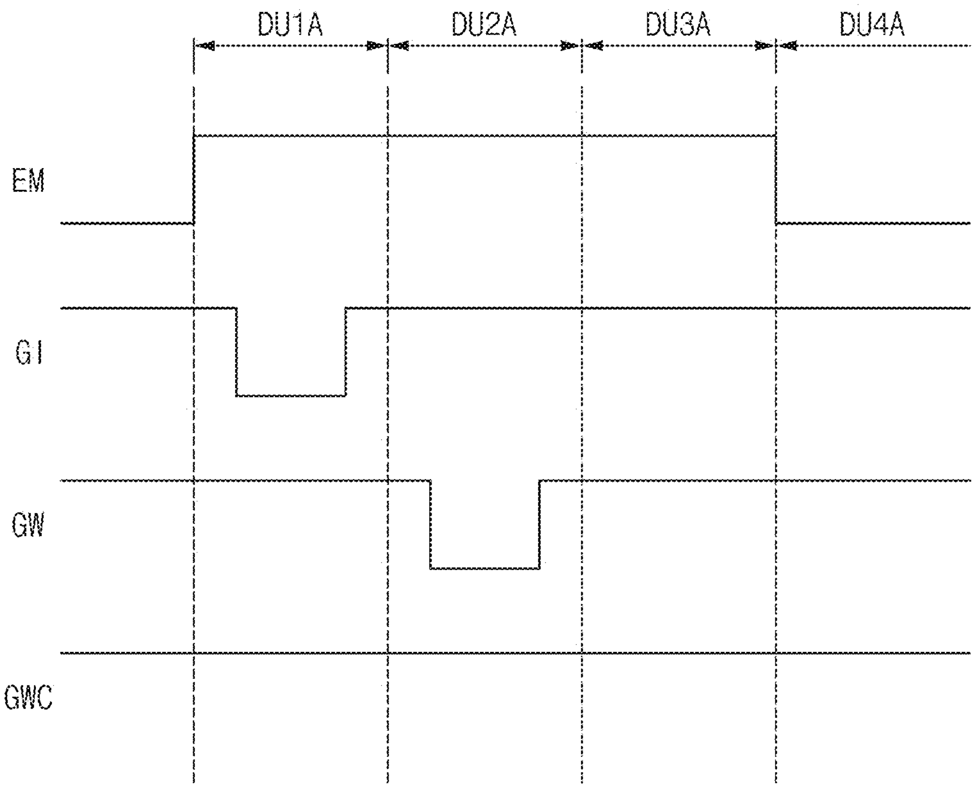
FIG. 3 is a timing diagram illustrating input signals applied to the pixel of FIG. 2.

FIG. 2 is a circuit diagram illustrating a pixel 110 of FIG. 1. FIG. 3 is a timing diagram illustrating input signals applied to the pixel 110 of FIG. 2.

In an embodiment, a pixel 110 receives a first writing signal GW, a second writing signal GWC, an initialization signal GI, the data voltage VDATA, the emission signal EM and the light emitting element EE emits light based on the data voltage VDATA and displays the image.

The pixel 110 may include the light emitting element EE, a driving transistor T1 that apples a driving current to the light emitting element EE, a data writing transistor that apples the data voltage VDATA to the driving transistor T1 in response to the first writing signal GW and connected to a first electrode of the driving transistor T1 and a leakage current compensator that operates in a way such that a turned-off state of the driving transistor T1 is maintained in an emission waiting period. The leakage current compensator may be connected to a first electrode of the driving transistor T1. In the embodiment, the leakage current compensator may include an eighth transistor T8. For example, the eighth transistor T8 may be called as a leakage current compensation transistor.

In an embodiment, as shown in FIG. 2, the pixel 110 may include a first transistor T1, a second transistor T2, a third transistor T3, a fourth transistor T4, a fifth transistor T5, a sixth transistor T6, a seventh transistor T7, the eighth transistor T8, a second capacitor C2 and the light emitting element EE.

The first transistor T1 may include a control electrode connected to a first node N1, a first electrode connected to a second node N2 and a second electrode connected to a third node N3.

The second transistor T2 may include a control electrode configured to receive (or connected to a line that transmits) the first writing signal GW, a first electrode configured to receive the data voltage VDATA and a second electrode connected to the second node N2.

The third transistor T3 may include a control electrode configured to receive the first writing signal GW, a first electrode connected to the node N3 and a second electrode connected to the first node N1.

Although an embodiment where the third transistor T3 is a single transistor is shown in in FIG. 2 for convenience of illustration and description, the third transistor T3 may include or be defined by two transistors (dual transistors) connected to each other in series.

The fourth transistor T4 may include a control electrode configured to receive the initialization signal GI, a first electrode configured to receive an initialization voltage VINT and a second electrode connected to the first node N1. The initialization voltage VINT may be called as a first initialization voltage.

Although an embodiment where the fourth transistor T4 is a single transistor is shown in in FIG. 2 for convenience of illustration and description, the fourth transistor T4 may include or defined by two transistors (dual transistors) connected to each other in series.

The fifth transistor T5 may include a control electrode configured to receive the emission signal EM, a first electrode configured to receive a first power voltage ELVDD and a second electrode connected to the second node N2.

The sixth transistor T6 may include a control electrode configured to receive the emission signal EM, a first electrode connected to the third node N3 and a second electrode connected to a fourth node N4.

The seventh transistor T7 may include a control electrode configured to receive the first writing signal GW, a first electrode configured to receive the initialization voltage VINT and a second electrode connected to the fourth node N4.

The eighth transistor T8 may include a control electrode configured to receive the second writing signal GWC, a first electrode configured to receive the data voltage VDATA and a second electrode connected to the third node N3. In an embodiment, for example, an inactivation level of the second writing signal GWC may be maintained, that is, a voltage level of the second writing signal GWC may be maintained at the inactivation level. In an embodiment, for example, the second writing signal GWC may have a direct current voltage. In an embodiment, for example, the eighth transistor T8 may be always turned off by the second writing signal GWC.

In an embodiment, for example, the first to eighth transistors T1 to T8 may be P-type thin film transistors. The control electrodes of the first to eighth transistors T1 to T8 may be gate electrodes, the first electrodes of the first to eighth transistors T1 to T8 may be source electrodes and the third electrodes of the first to eighth transistors T1 to T8 may be drain electrodes. The source electrode and the drain electrode of the first to eighth transistors T1 to T8 may be called as opposite electrodes which are opposites to each other.

The second capacitor C2 may include a first electrode configured to receive the first power voltage ELVDD and a second electrode connected to the first node N1.

The light emitting element EE may include an anode connected to the fourth node N4 and a cathode configured to receive a second power voltage ELVSS. The second power voltage ELVSS may be lower than the first power voltage ELVDD.

The first transistor T1 may be called as the driving transistor T1. The second transistor T2 may be called as the data writing transistor. The eighth transistor T8 may be called as the leakage current compensation transistor. The second capacitor C2 may be called as a storage capacitor.

Referring to FIG. 3, in a first period DU1A, the first node N1 and the second capacitor C2 are initialized by the initialization signal GI. In a second period DU2A, a threshold voltage of the first transistor T1 is compensated by the first writing signal GW, the data voltage VDATA in which the threshold voltage of the first switching element T1 is compensated is applied to the first node N1 and the anode of the light emitting element EE is initialized by the first writing signal GW. A third period DU3A may be called as the emission waiting period. The emission waiting period may be subsequent to a writing period in which the first writing signal GW has an activation level. In an embodiment, for example, the emission waiting period may have the first writing signal GW having an inactivation level after having an activation level and the emission signal before having an activation level. In a fourth period DU4A, the light emitting element EE emits a light in response to the emission signal EM, so that the display panel 100 displays an image.

In the first period DU1A, the initialization signal GI may have an activation level. In an embodiment, for example, the activation level of the initialization signal GI may be a low level. When the initialization signal GI has the activation level, the fourth transistor T4 may be turned on. Accordingly, the initialization voltage VINT may be applied to the first node N1. For example, the first period DU1A may be called as an initialization period.

In the second period DU2A, the first writing signal GW may have an activation level. In an embodiment, for example, the activation level of the first writing signal GW may be a low level. When the first writing signal GW has the activation level, the second transistor T2 and the third transistor T3 may be turned on. In the second period DU2A, the first transistor T1 may be turned on by the initialization voltage VINT. In the second period DU2A, since the first writing signal GW may have the activation level, the seventh transistor T7 may be turned on. Accordingly, the initialization voltage VINT may be applied to the anode of the light emitting element EE. For example, the second period DU2A may be called as the writing period.

In the second period DU2A, the voltage of the first node N1 may have a sum of the data voltage VDATA and a threshold voltage of the first transistor T1 through a path of the first transistor T1, the second transistor T2 and the third transistor T3.

The third period DU3A may be a period for awaiting the emission signal EM. In the third period DU3A, an inactivation level of the first writing signal GW and an inactivation level of the second writing signal GWC may be maintained.

In an embodiment, a threshold voltage of a transistor may be changed by a frictional electricity and a high temperature condition. In an embodiment, for example, where a transistor may be a P-type thin film transistor, a threshold voltage of the P-type transistor may be positively shifted by a frictional electricity and a high temperature condition. Accordingly, a threshold voltage of the P-type thin film transistor may have a positive value. For example, the positive value may be called a positive threshold voltage. In a conventional pixel (e.g. a pixel not including the eighth transistor T8), when a threshold voltage of the transistor is changed by a frictional electricity and a high temperature condition, a driving transistor T1 of the conventional pixel may be turned on. Accordingly, a voltage of a control electrode of the driving transistor T1 of the conventional pixel may be changed, such that the luminance control of the conventional pixel may be deteriorated.

In an embodiment of the invention, when a leakage current flows through the second transistor T2 and the eighth transistor T8, a voltage (e.g. ΔVDATA) that is lower than the data voltage VDATA may be applied to the second node N2 and the third node N3. Accordingly, a voltage of the first electrode of the driving transistor T1 and a voltage of the second electrode of the driving transistor T1 may be substantially the same as each other. Accordingly, the driving transistor T1 may be turned off. In an embodiment, for example, a turned-off state of the driving transistor T1 may be maintained.

The first electrode (e.g. a source electrode) of the third transistor T3 may have the voltage (e.g. ΔVDATA) that is lower than the data voltage VDATA. A voltage obtained by subtracting a voltage of the first electrode (e.g. the source electrode) of the third transistor T3 from a voltage of the control electrode of the third transistor T3 may be higher than the positive threshold voltage. Accordingly, the turned-off state of the third transistor T3 may be maintained. Accordingly, the voltage of the control electrode of the driving transistor T1 may be maintained, such that a luminance control of the pixel 110 may be enhanced and the display quality of the display panel 100 may be enhanced.

In an embodiment, for example, the first period DU1A, the second period DU2A and the third period DU3A may be collectively defined as a non-emission period.

In the fourth period DU4A, the emission signal EM may have an activation level. In an embodiment, for example, the activation level of the emission signal EM may be a low level. When the emission signal EM may have the activation level, the fifth transistor T5 and the sixth transistor T6 may be turned on. Additionally, the first transistor T1 may be turned on by the data voltage VDATA. For example, the fourth period DU4A may be called as an emission period.

In the fourth period DU4A, the driving current may be applied to the light emitting element EE through a path of the fifth transistor T5, the first transistor T1 and the sixth transistor T6. The driving current may be determined by the data voltage VDATA. A luminance of the light emitting element EE may be determined by the driving current.

Figure 4:
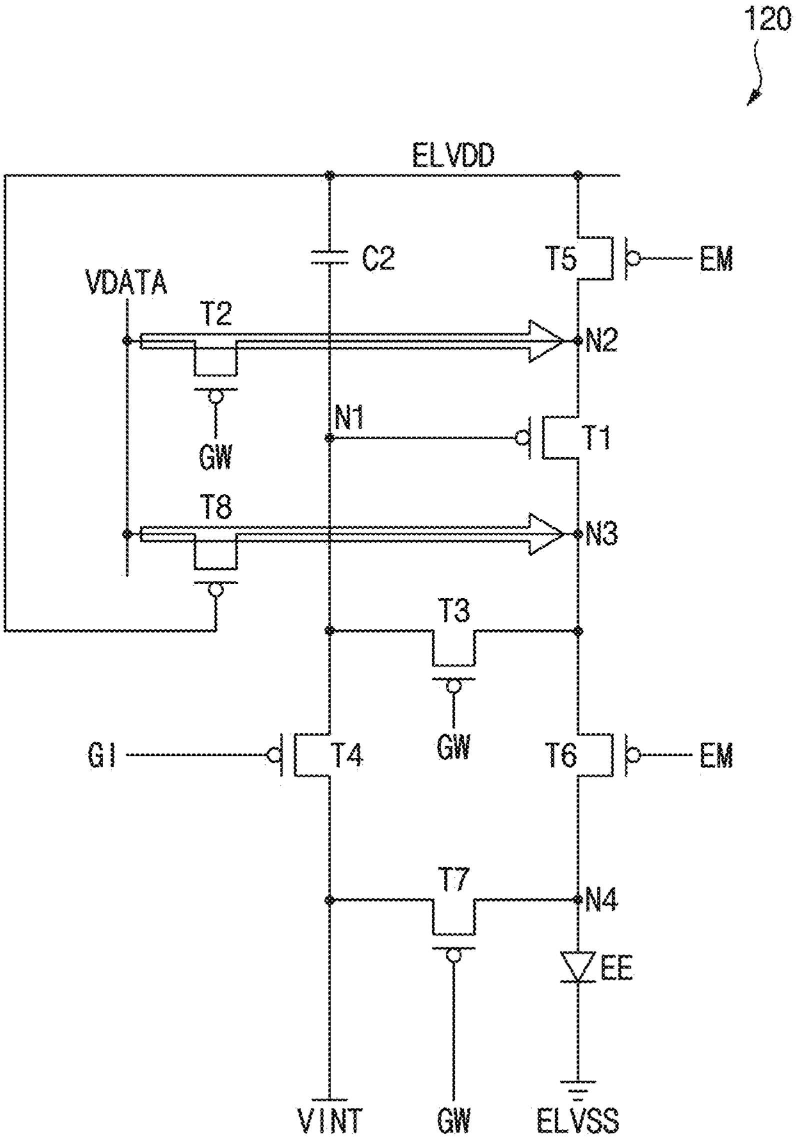
FIG. 4 is a circuit diagram illustrating a pixel of a display apparatus according to an embodiment of the invention.

FIG. 4 is a circuit diagram illustrating a pixel 120 of a display apparatus according to an embodiment of the invention.

A display apparatus according to an embodiment shown in FIG. 4 is substantially the same as the display apparatus according to the embodiment described above referring to FIGS. 1 to 3 except that the first power voltage ELVDD is applied to the control electrode of the eighth transistor T8 of a pixel 120. Thus, the same reference numerals will be used to refer to the same or like parts as those described above referring to FIGS. 1 to 3 and any repetitive detailed description thereof will be omitted.

Referring to FIG. 4, in an embodiment, the pixel 120 includes the eighth transistor T8. Accordingly, when a leakage current flows through the second transistor T2 and the eighth transistor T8, a voltage of the first electrode of the driving transistor T1 and a voltage of the second electrode of the driving transistor T1 may be substantially the same as each other. Accordingly, a turned-off state of the driving transistor T1 may be maintained. Accordingly, the voltage of the control electrode of the driving transistor T1 may be maintained, such that a luminance control of the pixel 120 may be enhanced and the display quality of the display panel 100 may be enhanced.

In an embodiment, the second writing signal GWC may be the first power voltage ELVDD. Accordingly, lines of the pixel 120 may be reduced, such that an integration and a reliability of the pixel 120 may be enhanced.

Figure 5:
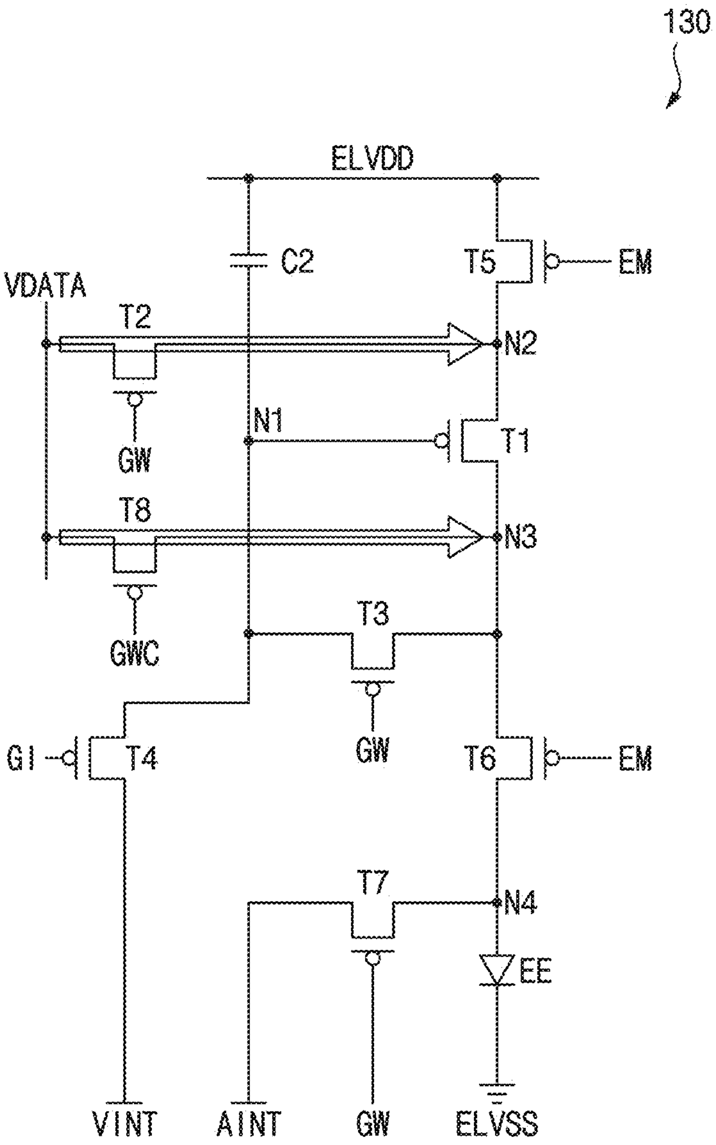
FIG. 5 is a circuit diagram illustrating a pixel of a display apparatus according to an embodiment of the invention.

FIG. 5 is a circuit diagram illustrating a pixel 130 of a display apparatus according to an embodiment of the invention.

A display apparatus according to an embodiment shown in FIG. 5 is substantially the same as the display apparatus according to the embodiment described above referring to FIGS. 1 to 3 except that a second initialization voltage AINT is applied to a first electrode of the seventh transistor T7 of a pixel 130. Thus, the same reference numerals will be used to refer to the same or like parts as those described in the previous embodiment of FIGS. 1 to 3 and any repetitive detailed description thereof will be omitted.

Referring to FIG. 5, in an embodiment, the pixel 130 includes the eighth transistor T8. Accordingly, when a leakage current flows through the second transistor T2 and the eighth transistor T8, a voltage of the first electrode of the driving transistor T1 and a voltage of the second electrode of the driving transistor T1 may be substantially the same. Accordingly, a turned-off state of the driving transistor T1 may be maintained and the voltage of the control electrode of the driving transistor T1 is maintained, such that a luminance control of the pixel 130 may be enhanced and the display quality of the display panel 100 may be enhanced. In such an embodiment, the second initialization voltage AINT is applied to the first electrode of the seventh transistor T7, such that the stability of the pixel 130 may be enhanced.

Figure 6:
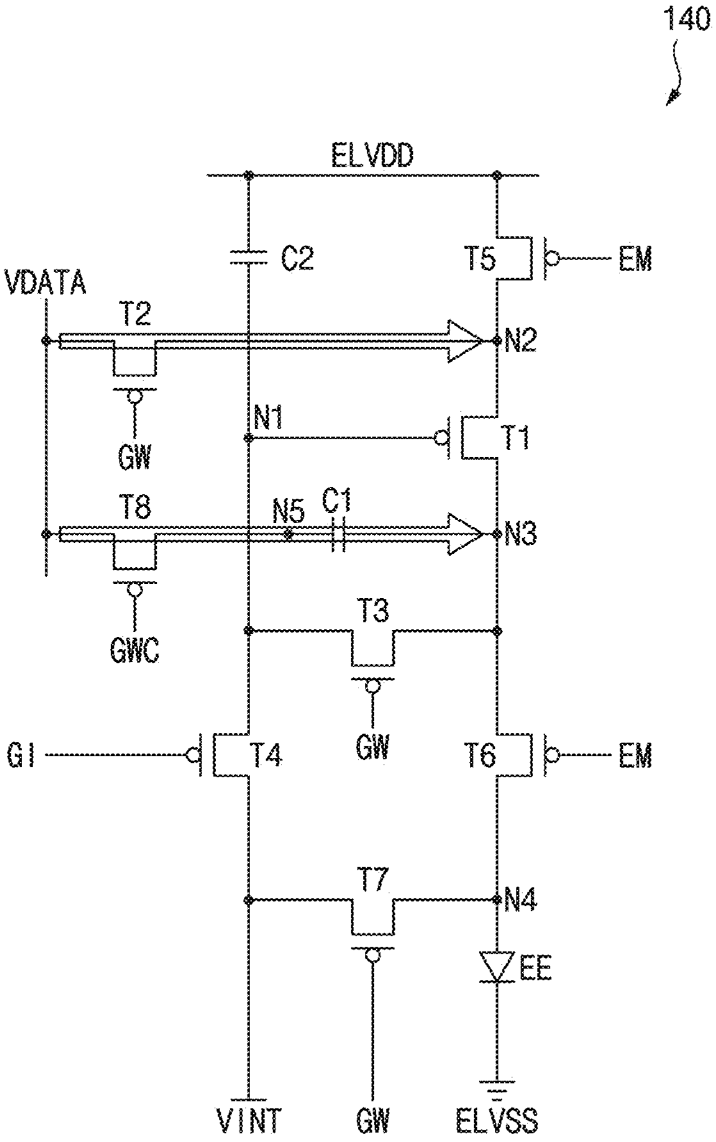
FIG. 6 is a circuit diagram illustrating a pixel of a display apparatus according to an embodiment of the invention.

FIG. 6 is a circuit diagram illustrating a pixel 140 of a display apparatus according to an embodiment of the invention.

A display apparatus according to an embodiment shown in FIG. 6 is substantially the same as the display apparatus according to the embodiment described above referring to FIGS. 1 to 3 except that a pixel 140 further includes a first capacitor C1. Thus, the same reference numerals will be used to refer to the same or like parts as those described in the previous embodiment of FIGS. 1 to 3 and any repetitive detailed description thereof will be omitted.

Referring to FIG. 6, in an embodiment, the first capacitor C1 may include a first electrode connected to a second electrode of the eighth transistor T8 and a second electrode connected to the third node N3. In an embodiment, for example, the second electrode of the eighth transistor T8 may be connected to the first electrode of the first capacitor C1 at the fifth node N5.

In an embodiment, a parasitic capacitance may occur by a connection between the second electrode of the second transistor T2 and the first electrode of the driving transistor T1. In such an embodiment, the leakage current compensator of the pixel 140 further includes the first capacitor C1, such that a voltage of the second electrode (e.g. drain electrode) of the driving transistor T1 may be higher than a voltage of the first electrode (e.g. source electrode) of the driving transistor T1 through a charge sharing between the parasitic capacitance and the first capacitor C1. Accordingly, a turned-off state of the driving transistor T1 may be maintained.

Accordingly, a voltage of the control electrode of the driving transistor T1 may be maintained. In such an embodiment, since the voltage of the control electrode of the driving transistor T1 is maintained, a luminance control of the pixel 140 may be enhanced, so that the display quality of the display panel 100 may be enhanced.

Figure 7:
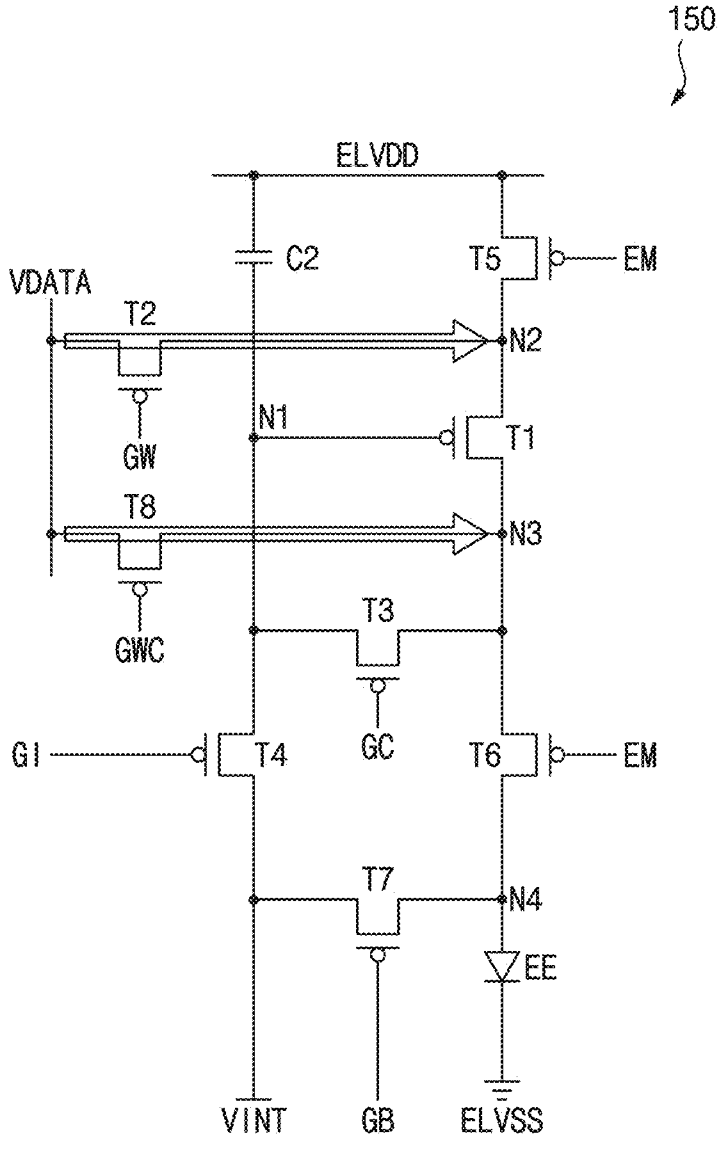
FIG. 7 is a circuit diagram illustrating a pixel of a display apparatus according to an embodiment of the invention.

FIG. 7 is a circuit diagram illustrating a pixel 150 of a display apparatus according to an embodiment of the invention.

A display apparatus according to an embodiment shown in FIG. 7 is substantially the same as the display apparatus according to the embodiment described above referring to FIGS. 1 to 3 except that the control electrode of the third transistor T3 of a pixel 150 receives a compensation signal GC instead of the first writing signal GW and the control electrode of the seventh transistor T7 of the pixel 150 receives a light emitting element initialization signal GB instead of the first writing signal GW. Thus, the same reference numerals will be used to refer to the same or like parts as those described in the previous embodiment of FIGS. 1 to 3 and any repetitive detailed description thereof will be omitted.

Figure 8:
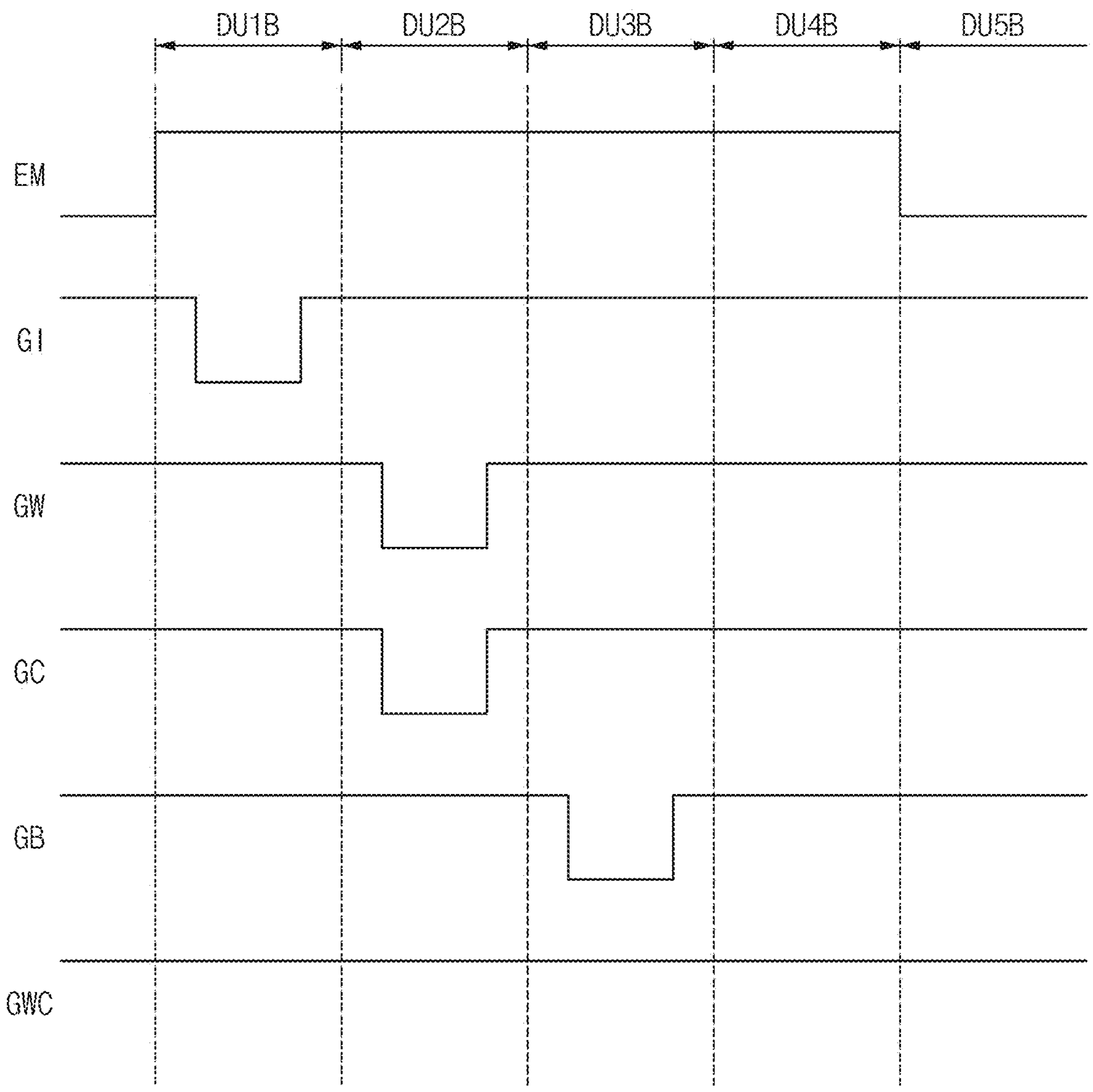
FIG. 8 is a timing diagram illustrating input signals applied to the pixel of FIG. 7.

FIG. 8 is a timing diagram illustrating input signals applied to the pixel of FIG. 7.

Referring to FIGS. 1, 7 and 8, in a first period DU1B, the first node N1 and the storage capacitor may be initialized by the initialization signal GI. In a second period DU2B, the threshold voltage of the first transistor T1 may be compensated by the first writing signal GW and the compensation signal GC, and the data voltage VDATA in which the threshold voltage of the first transistor T1 is compensated may be applied to the first node N1. In a third period DU3B, the anode of the light emitting element EE may be initialized by the light emitting element initialization signal GB. The fourth period DU4B may be an emission waiting period for awaiting the emission signal. In the fourth period DU4B, an inactivation level of the first writing signal GW and an inactivation level of the second writing signal GWC may be maintained, that is, voltage levels of the first writing signal GW and the second writing signal GWC may be maintained at an inactivation. In a fifth period DU5B, the light emitting element EE may emit a light in response to the emission signal EM and the display panel 100 may display an image.

In the first period DU1B, the initialization signal GI may have an activation level. In an embodiment, for example, the activation level of the initialization signal GI may be a low level. When the initialization signal GI has the activation level, the fourth transistor T4 may be turned on, so that the initialization voltage VINT may be applied to the first node N1.

In the second period DU2B, the first writing signal GW and the compensation signal GC may have an activation level. In an embodiment, for example, the activation level of the first writing signal GW and the activation level of the compensation signal GC may be a low level. When the first writing signal GW and the compensation signal GC have the activation level, the second transistor T2 and the third transistor T3 may be turned on. Additionally, the first transistor T1 may be turned on by the initialization voltage VINT.

In an embodiment of the invention, the control electrode of the second transistor T2 and the control electrode of the third transistor T3 may be connected to each other.

Although an embodiment where the first writing signal GW and the compensation signal GC have the activation level at substantially the same timing, the invention is not limited thereto. Alternatively, an activation period of the first writing signal GW and an activation period of the compensation signal GC partially overlap with each other, but the first writing signal GW and the compensation signal GC may have the activation level at different timings.

In the second period DU2B, the voltage of the first node N1 may have a sum of the data voltage VDATA and a threshold voltage of the first transistor T1 through a path of the first transistor T1, the second transistor T2 and the third transistor T3 which are turned on.

In the third period DU3B, the light emitting element initialization signal GB may have an activation level. In an embodiment, for example, the activation level of the light emitting element initialization signal GB may be a low level. When the light emitting element initialization signal GB has the activation level, the seventh transistor T7 may be turned on, such that the initialization voltage VINT may be applied to the anode of the light emitting element EE.

In the fourth period DU4B, the initialization signal GI, the first writing signal GW, the compensation signal GC, the light emitting element initialization signal GB and the second writing signal GWC may have an inactivation level. For example, the fourth period DU4B may be an emission waiting period.

In the fifth period DU5B, the emission signal EM may have an activation level. In an embodiment, for example, the activation level of the emission signal EM may be a low level. When the emission signal EM may have the activation level, the fifth transistor T5 and the sixth transistor T6 may be turned on. In the fifth period DU5B, the first transistor T1 may be turned on by the data voltage VDATA.

In the fifth period DU5B, the driving current may sequentially flow through the fifth transistor T5, the first transistor T1 and the sixth transistor T6 and may drive the light emitting element EE. The intensity of the driving current may be determined by the data voltage VDATA. A luminance of the light emitting element EE may be determined by the intensity of the driving current.

Figure 9:
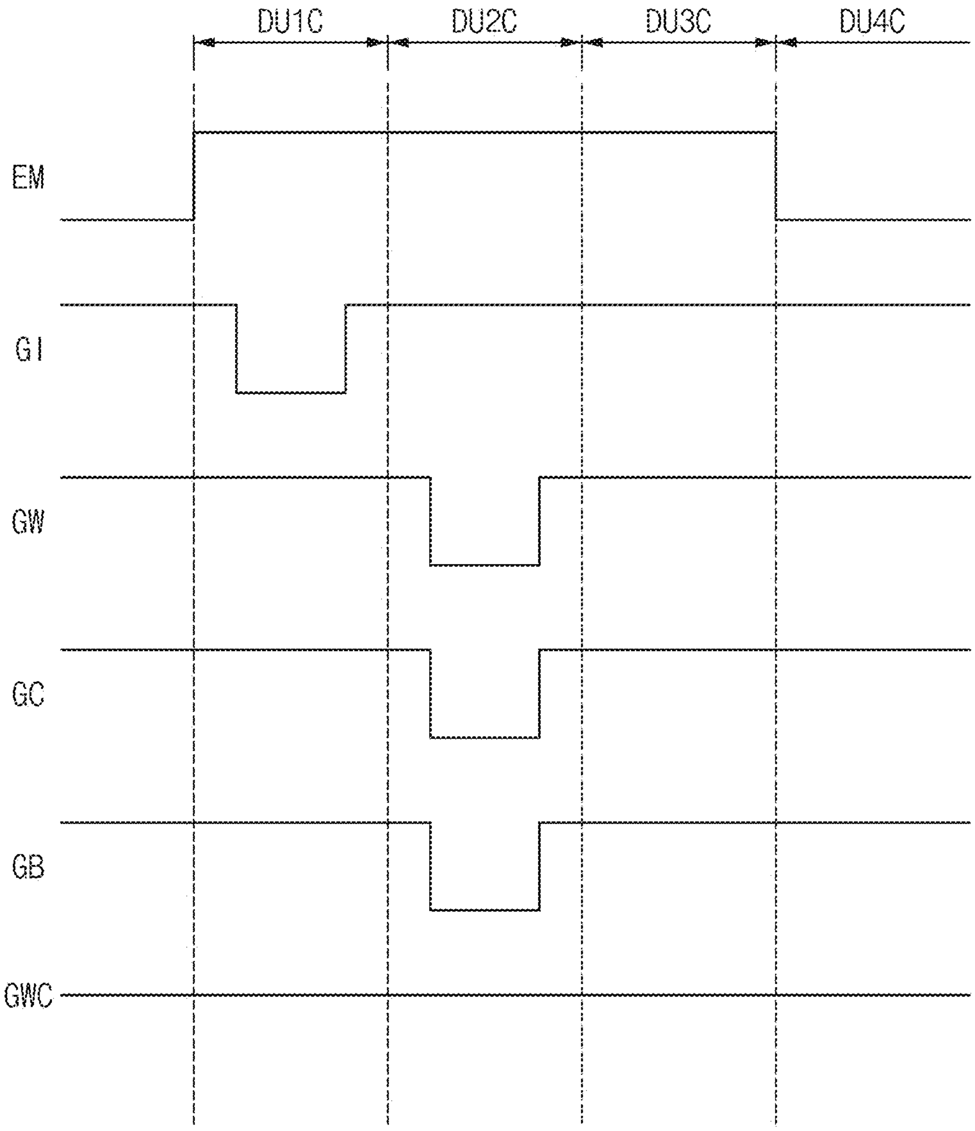
FIG. 9 is a timing diagram illustrating input signals applied to the pixel of FIG. 7.

FIG. 9 is a timing diagram illustrating input signals applied to the pixel of FIG. 7.

Referring to FIGS. 1, 7 and 9, an embodiment of the display panel 100 includes a pixel 150 and each of the pixels includes the light emitting element EE.

The pixels receive the first writing signal GW, the second writing signal GWC, the compensation signal GC, the initialization signal GI, the light emitting element initialization signal GB and the emission signal EM, the light emitting element EE emits light having a luminance corresponding to a level of the data voltage VDATA and displays the image.

In an embodiment, an activation period of the initialization signal GI applied to the control electrode of the fourth transistor T4 may have a different timing from an activation period of the first writing signal GW applied to the control electrode of the second transistor T2.

The activation period of the first writing signal GW may be substantially the same as an activation period of the compensation signal GC applied to the control electrode of the third transistor T3.

The activation period of the first writing signal GW may be substantially the same as an activation period of the light emitting element initialization signal GB applied to the control electrode of the seventh transistor T7.

In an embodiment, as shown in FIG. 9, in a first period DU1C, the first node N1 and the storage capacitor are initialized by the initialization signal GI. In a second period DU2C, the threshold voltage of the first transistor T1 is compensated by the first writing signal GW and the compensation signal GC and the data voltage VDATA in which the threshold voltage of the first transistor T1 is compensated is applied to the first node N1. In the second period DU2C, the anode of the light emitting element EE is initialized by the light emitting element initialization signal GB. A third period DU3C may be the emission waiting period. In the third period DU3C, an inactivation level of the first writing signal GW and an inactivation level of the second writing signal GWC may be maintained, that is, voltage levels of the first writing signal GW and the second writing signal GWC may be maintained at an inactivation level. In a fourth period DU4C, the light emitting element EE emits a light in response to the emission signal EM and the display panel 100 displays an image.

Figure 10:
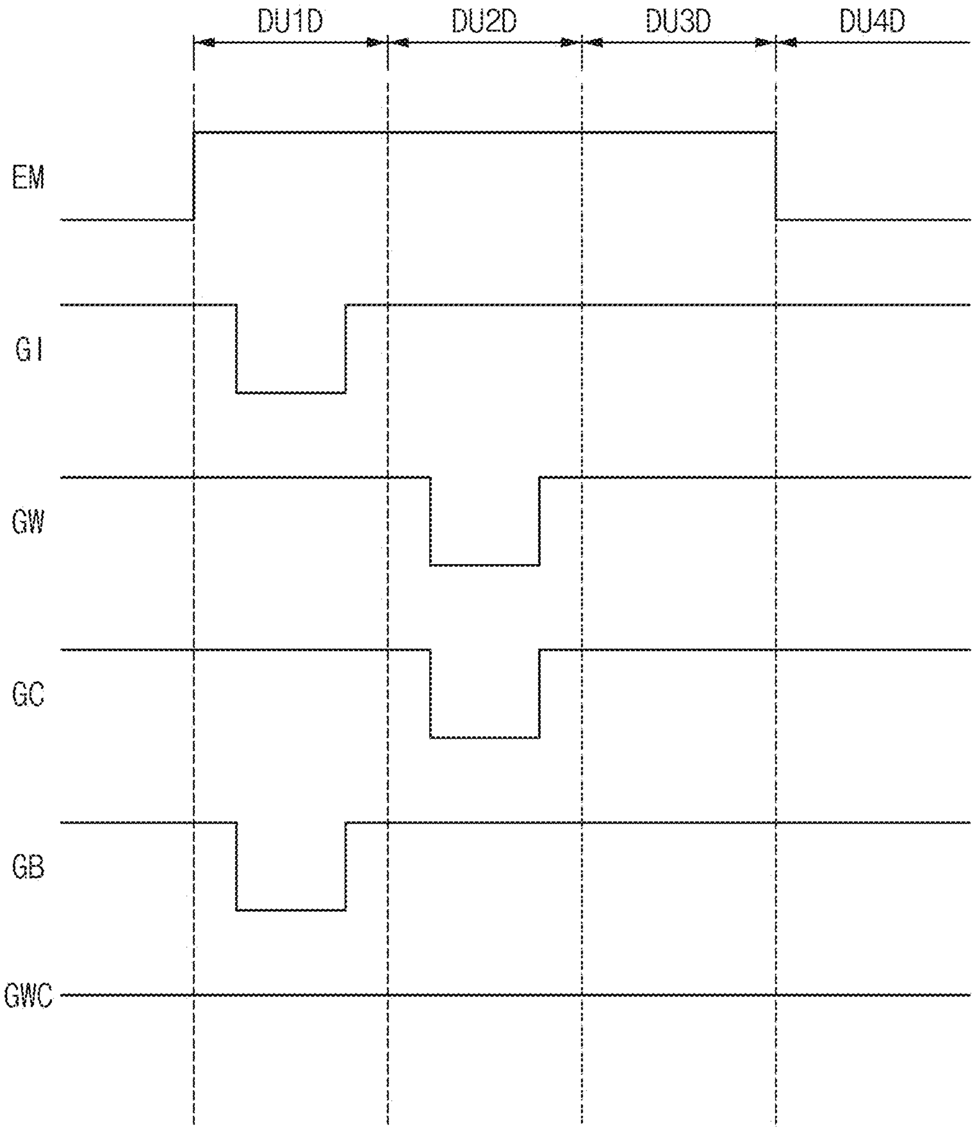
FIG. 10 is a timing diagram illustrating input signals applied to the pixel of FIG. 7.

FIG. 10 is a timing diagram illustrating input signals applied to the pixel 150 of FIG. 7.

Referring to FIGS. 1, 7 and 10, an embodiment of the display panel 100 includes a pixel 150 and each of the pixels includes the light emitting element EE. The pixels receive the first writing signal GW, the second writing signal GWC, the compensation signal GC, the initialization signal GI, the light emitting element initialization signal GB, the data voltage VDATA and the emission signal EM, and the light emitting element EE emits light having a luminance corresponding to a level of the data voltage VDTA and display the image.

In an embodiment, an activation period of the initialization signal GI applied to the control electrode of the fourth transistor T4 may be different from (or may not overlap) an activation period of the first writing signal GW applied to the control electrode of the second transistor T2.

The activation period of the first writing signal GW may be substantially the same as an activation period of the compensation signal GC applied to the control electrode of the third transistor T3.

The activation period of the initialization signal GI may be substantially the same as an activation period of the light emitting element initialization signal GB applied to the control electrode of the seventh transistor T7.

In an embodiment, as shown in FIG. 10, in a first period DU1D, the first node N1 and the storage capacitor are initialized by the initialization signal GI. In the first period DU1D, the anode of the light emitting element EE is initialized by the light emitting element initialization signal GB. In a second period DU2D, the threshold voltage of the first transistor T1 is compensated by the first writing signal GW and the compensation signal GC and the data voltage VDATA in which the threshold voltage of the first transistor T1 is compensated is applied to the first node N1. A third period DU3D may be a period for awaiting the emission signal. In the third period DU3D, an inactivation level of the first writing signal GW and an inactivation level of the second writing signal GWC may be maintained. In a fourth period DU4D, the light emitting element EE may emit a light in response to the emission signal EM. In the fourth period DU4D, the display panel 100 displays an image.

Figure 11:
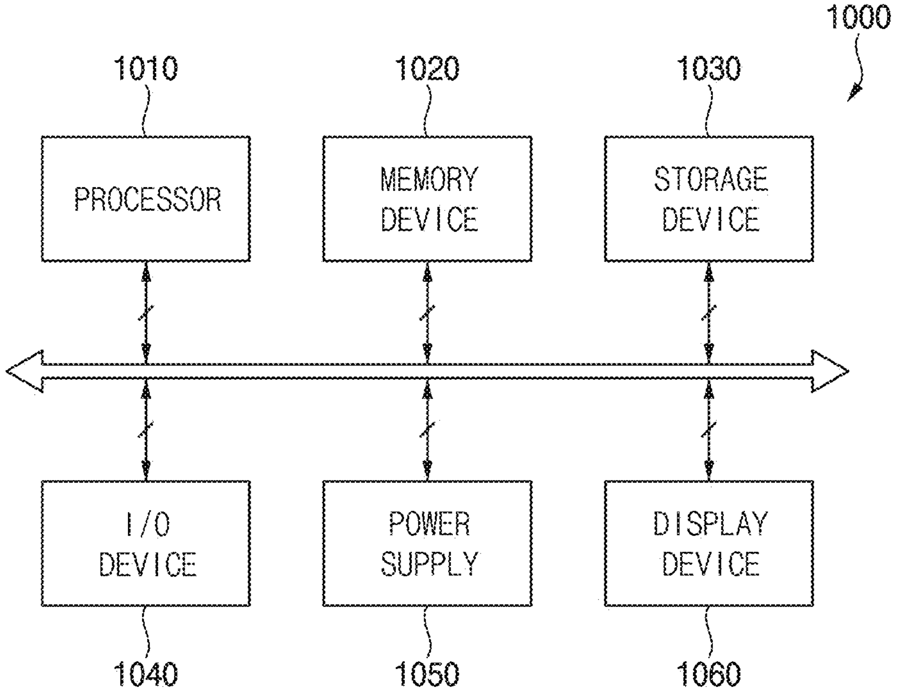
FIG. 11 is a block diagram illustrating an electronic apparatus according to an embodiment of the invention.
Figure 12:
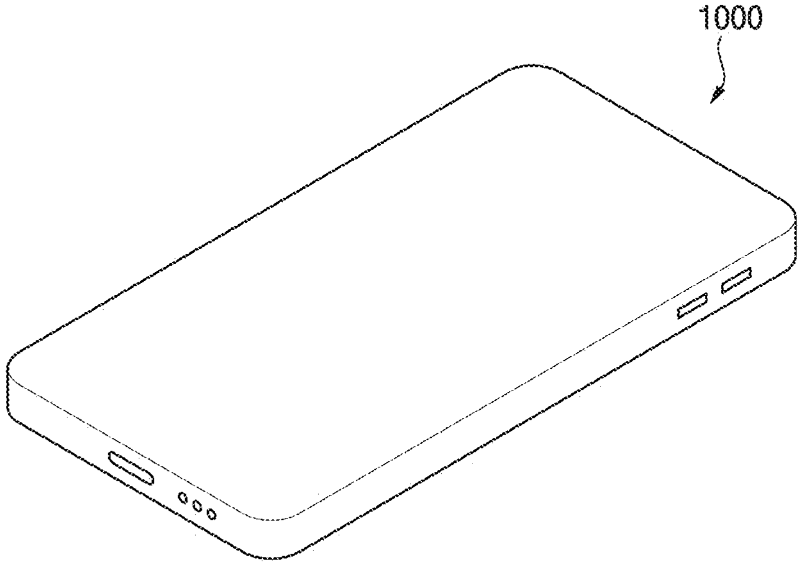
FIG. 12 is a view illustrating an example in which the electronic apparatus of FIG. 11 is implemented as a smart phone.

FIG. 11 is a block diagram illustrating an electronic apparatus according to an embodiment of the invention. FIG. 12 is a view illustrating an example in which the electronic apparatus of FIG. 11 is implemented as a smart phone.

Referring to FIGS. 11 and 12, an embodiment of the electronic apparatus 1000 may include a processor 1010, a memory device 1020, a storage device 1030, an input/output (I/O) device 1040, a power supply 1050 and a display device 1060. Here, the display device 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

According to an embodiment, as shown in FIG. 12, the electronic apparatus 1000 may be implemented as a smart phone. However, the electronic apparatus 1000 is not limited thereto. In an embodiment, for example, the electronic apparatus 1000 may be implemented as a cellular phone, a video phone, a smart pad, a smart watch, a tablet computer, a car navigation system, a computer monitor, a laptop, a head mounted display (HMD) device or the like.

The processor 1010 may perform various computing functions or various tasks. The processor 1010 may be a micro-processor, a central processing unit (CPU), an application processor (AP) or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device or the like and/or at least one volatile memory device such as a dynamic random access memory (DRAM) device, a static random access memory (SRAM) device, a mobile DRAM device or the like.

The storage device 1030 may include a solid state drive (SSD) device, a hard disk drive (HDD) device, a CD-ROM device or the like. The I/O device 1040 may include an input device such as a keyboard, a keypad, a mouse device, a touch-pad, a touch-screen and the like and an output device such as a printer, a speaker or the like. In some embodiments, the display device 1060 may be included in the I/O device 1040. The power supply 1050 may provide power for operations of the electronic apparatus 1000. The display device 1060 may be coupled to other components via the buses or other communication links.

In a pixel and a display apparatus according to embodiments of the invention maya turned-off state of a driving transistor is maintained even when leakage current flows through a data writing transistor, such that a luminance control of the pixel is enhanced, and a display quality of a display panel is enhanced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel comprising:

a light emitting element;

a driving transistor which applies a driving current to the light emitting element;

a data writing transistor which applies a data voltage in response to a first writing signal and is connected to a first electrode of the driving transistor; and a leakage current compensator connected to a second electrode of the driving transistor, wherein the leakage current compensator operates in response to a second writing signal different from the first writing signal in a way such that a turned-off state of the driving transistor is maintained in an emission waiting period, and wherein a voltage level of the second writing signal is maintained constantly at an inactivation level throughout an entirety of a frame period.

2. The pixel of claim 1, wherein the leakage current compensator comprises an eighth transistor including a control electrode which receives the second writing signal, a first electrode which receives the data voltage and a second electrode connected to the second electrode of the driving transistor.

3. The pixel of claim 1, wherein the pixel further comprises a storage capacitor, wherein the storage capacitor includes a first electrode which receives a first power voltage and a second electrode connected to a control electrode of the driving transistor, and wherein the second writing signal is the first power voltage.

4. The pixel of claim 1, wherein the leakage current compensator comprises an eighth transistor and a first capacitor, wherein the eighth transistor includes a control electrode which receives the second writing signal, a first electrode which receives the data voltage and second electrode connected to a fifth node, and wherein the first capacitor includes a first electrode connected to the fifth node and a second electrode connected to the second electrode of the driving transistor.

5. The pixel of claim 1, wherein the emission waiting period is subsequent to a writing period in which the first writing signal has an activation level and wherein the first writing signal and the second writing signal have an inactivation level in the emission waiting period.

6. The pixel of claim 1, wherein the pixel comprises:

a first transistor including a control electrode connected to a first node, a first electrode connected to a second node and a second electrode connected to a third node;

a second transistor including a control electrode which receives the first writing signal, a first electrode which receives the data voltage and a second electrode connected to the second node;

a third transistor including a control electrode which receives the first writing signal, a first electrode connected to the third node and a second electrode connected to the first node;

a fourth transistor including a control electrode which receives an initialization signal, a first electrode which receives an initialization voltage and a second electrode connected to the first node;

a fifth transistor including a control electrode which receives an emission signal, a first electrode which receives a first power voltage and a second electrode connected to the second node;

a sixth transistor including a control electrode which receives the emission signal, a first electrode connected to the third node and a second electrode connected to a fourth node;

a seventh transistor including a control electrode which receives the first writing signal, a first electrode which receives the initialization voltage and a second electrode connected to the fourth node;

an eighth transistor including a control electrode which receives the second writing signal, a first electrode which receives the data voltage and a second electrode connected to the third node;

a second capacitor including a first electrode which receives the first power voltage and a second electrode connected to the first node; and the light emitting element including a first electrode connected to the fourth node and a second electrode which receives a second power voltage, wherein the driving transistor is the first transistor, wherein the data writing transistor is the second transistor, and wherein the leakage current compensator includes the eighth transistor.

7. The pixel of claim 6, wherein the frame period of the pixel comprises:

an initialization period in which the emission signal has an inactivation level, the initialization signal has an activation level, the first writing signal has an inactivation level and the second writing signal has an inactivation level;

a writing period in which the emission signal has an inactivation level, the initialization signal has an inactivation level, the first writing signal has an activation level and the second writing signal has an inactivation level;

the emission waiting period in which the emission signal has an inactivation level, the initialization signal has an inactivation level, the first writing signal has an inactivation level and the second writing signal has an inactivation level; and an emission period in which the emission signal has an activation level, the initialization signal has an inactivation level, the first writing signal has an inactivation level and the second writing signal has an inactivation level.

8. The pixel of claim 1, wherein the pixel comprises:

a first transistor including a control electrode connected to a first node, a first electrode connected to a second node and a second electrode connected to a third node;

a second transistor including a control electrode which receives the first writing signal, a first electrode which receives the data voltage and a second electrode connected to the second node;

a third transistor including a control electrode which receives the first writing signal, a first electrode connected to the third node and a second electrode connected to the first node;

a fourth transistor including a control electrode which receives an initialization signal, a first electrode which receives an initialization voltage and a second electrode connected to the first node;

a fifth transistor including a control electrode which receives an emission signal, a first electrode which receives a first power voltage and a second electrode connected to the second node;

a sixth transistor including a control electrode which receives the emission signal, a first electrode connected to the third node and a second electrode connected to a fourth node;

a seventh transistor including a control electrode which receives the first writing signal, a first electrode which receives the initialization voltage and a second electrode connected to the fourth node;

an eighth transistor including a control electrode which receives the second writing signal, a first electrode which receives the data voltage and a second electrode connected to a fifth node;

a first capacitor including a first electrode connected to the fifth node and a second electrode connected to the third node;

a second capacitor including a first electrode which receives the first power voltage and a second electrode connected to the first node; and the light emitting element including a first electrode connected to the fourth node and a second electrode which receives a second power voltage, wherein the driving transistor is the first transistor, wherein the data writing transistor is the second transistor, and wherein the leakage current compensator includes the eighth transistor and the first capacitor.

9. The pixel of claim 1, wherein the pixel comprises:

a first transistor including a control electrode connected to a first node, a first electrode connected to a second node and a second electrode connected to a third node;

a second transistor including a control electrode which receives the first writing signal, a first electrode which receives the data voltage and a second electrode connected to the second node;

a third transistor including a control electrode which receives the first writing signal, a first electrode connected to the third node and a second electrode connected to the first node;

a fourth transistor including a control electrode which receives an initialization signal, a first electrode which receives a first initialization voltage and a second electrode connected to the first node;

a fifth transistor including a control electrode which receives an emission signal, a first electrode which receives a first power voltage and a second electrode connected to the second node;

a sixth transistor including a control electrode which receives the emission signal, a first electrode connected to the third node and a second electrode connected to a fourth node;

a seventh transistor including a control electrode which receives the first writing signal, a first electrode which receives a second initialization voltage and a second electrode connected to the fourth node;

an eighth transistor including a control electrode which receives the second writing signal, a first electrode which receives the data voltage and a second electrode connected to the third node;

a second capacitor including a first electrode which receives the first power voltage and a second electrode connected to the first node; and the light emitting element including a first electrode connected to the fourth node and a second electrode which receives a second power voltage, wherein the driving transistor is the first transistor, wherein the data writing transistor is the second transistor, and wherein the leakage current compensator includes the eighth transistor.

10. The pixel of claim 1, wherein the pixel comprises:

a first transistor including a control electrode connected to a first node, a first electrode connected to a second node and a second electrode connected to a third node;

a second transistor including a control electrode which receives the first writing signal, a first electrode which receives the data voltage and a second electrode connected to the second node;

a third transistor including a control electrode which receive a compensation signal, a first electrode connected to the third node and a second electrode connected to the first node;

a fourth transistor including a control electrode which receives an initialization signal, a first electrode which receives an initialization voltage and a second electrode connected to the first node;

a fifth transistor including a control electrode which receives an emission signal, a first electrode which receives a first power voltage and a second electrode connected to the second node;

a sixth transistor including a control electrode which receives the emission signal, a first electrode connected to the third node and a second electrode connected to a fourth node;

a seventh transistor including a control electrode which receives the first writing signal, a first electrode which receives the initialization voltage and a second electrode connected to the fourth node;

an eighth transistor including a control electrode which receives the second writing signal, a first electrode which receives the data voltage and a second electrode connected to the third node;

a second capacitor including a first electrode which receives the first power voltage and a second electrode connected to the first node; and the light emitting element including a first electrode connected to the fourth node and a second electrode which receives a second power voltage, wherein the driving transistor is the first transistor, wherein the data writing transistor is the second transistor, and wherein the leakage current compensator includes the eighth transistor.

11. A display apparatus comprising:

a display panel including a pixel;

a gate driver which applies a gate signal to the pixel;

a data driver which applies a data voltage to the pixel; and an emission driver which applies an emission signal to the pixel and wherein the pixel comprises a light emitting element, a driving transistor which applies a driving current to the light emitting element, a data writing transistor which applies the data voltage in response to a first writing signal and connected to a first electrode of the driving transistor, and a leakage current compensator connected to a second electrode of the driving transistor, wherein the leakage current compensator operates in response to a second writing signal different from the first writing signal in a way such that a turned-off state of the driving transistor is maintained in an emission waiting period, and wherein a voltage level of the second writing signal is maintained constantly at an inactivation level throughout an entirety of a frame period.

12. The display apparatus of claim 11, wherein the leakage current compensator comprises an eighth transistor including a control electrode which receives the second writing signal, a first electrode which receives the data voltage and a second electrode connected to the second electrode of the driving transistor.

13. The display apparatus of claim 11, wherein the pixel further comprises a storage capacitor and wherein the storage capacitor includes a first electrode which receives a first power voltage and a second electrode connected to a control electrode of the driving transistor and wherein the second writing signal is the first power voltage.

14. The display apparatus of claim 11, wherein the leakage current compensator comprises an eighth transistor and a first capacitor, wherein the eighth transistor includes a control electrode which receives the second writing signal, a first electrode which receives the data voltage and second electrode connected to a fifth node, and wherein the first capacitor includes a first electrode connected to the fifth node and a second electrode connected to the second electrode of the driving transistor.

15. The display apparatus of claim 11, wherein the emission waiting period is subsequent to a writing period in which the first writing signal has an activation level, and wherein the first writing signal and the second writing signal have an inactivation level in the emission waiting period.

16. The display apparatus of claim 11, wherein the pixel comprises:

a first transistor including a control electrode connected to a first node, a first electrode connected to a second node and a second electrode connected to a third node;

a second transistor including a control electrode which receives the first writing signal, a first electrode which receives the data voltage and a second electrode connected to the second node;

a third transistor including a control electrode which receives the first writing signal, a first electrode connected to the third node and a second electrode connected to the first node;

a fourth transistor including a control electrode which receives an initialization signal, a first electrode which receives an initialization voltage and a second electrode connected to the first node;

a fifth transistor including a control electrode which receives the emission signal, a first electrode which receives a first power voltage and a second electrode connected to the second node;

a sixth transistor including a control electrode which receives the emission signal, a first electrode connected to the third node and a second electrode connected to a fourth node;

a seventh transistor including a control electrode which receives the first writing signal, a first electrode which receives the initialization voltage and a second electrode connected to the fourth node;

an eighth transistor including a control electrode which receives the second writing signal, a first electrode which receives the data voltage and a second electrode connected to the third node;

a second capacitor including a first electrode which receives the first power voltage and a second electrode connected to the first node; and the light emitting element including a first electrode connected to the fourth node and a second electrode which receives a second power voltage, wherein the driving transistor is the first transistor, wherein the data writing transistor is the second transistor, and wherein the leakage current compensator includes the eighth transistor.

17. An electronic apparatus comprising a display apparatus, wherein the display apparatus comprises:

a display panel including a pixel;

a gate driver which applies a gate signal to the pixel;

a data driver which applies a data voltage to the pixel; and an emission driver which applies an emission signal to the pixel and wherein the pixel comprises a light emitting element, a driving transistor which applies a driving current to the light emitting element, a data writing transistor which applies the data voltage in response to a first writing signal and connected to a first electrode of the driving transistor, and a leakage current compensator connected to a second electrode of the driving transistor, wherein the leakage current compensator operates in a way such that a turned-off state of the driving transistor is maintained in an emission waiting period in response to a second writing signal different from the first writing signal, and wherein a voltage level of the second writing signal is maintained constantly at an inactivation level throughout an entirety of a frame period.

* * * * *